(12) United States Patent
Shimbo et al.

(10) Patent No.: US 11,327,863 B2
(45) Date of Patent: May 10, 2022

(54) ELECTRONIC CONTROL DEVICE FOR PROCESSING CIRCUIT DIAGNOSTICS

(71) Applicant: Hitachi Automotive Systems, Ltd., Hitachinaka (JP)

(72) Inventors: Kenichi Shimbo, Tokyo (JP); Tadanobu Toba, Tokyo (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/272,098

(22) PCT Filed: Aug. 7, 2019

(86) PCT No.: PCT/JP2019/031268
§ 371 (c)(1),
(2) Date: Feb. 26, 2021

(87) PCT Pub. No.: WO2020/259347
PCT Pub. Date: Mar. 26, 2020

(65) Prior Publication Data
US 2021/0318940 A1 Oct. 14, 2021

(30) Foreign Application Priority Data
Sep. 19, 2018 (JP) .............................. JP2018-175217

(51) Int. Cl.
*G06F 11/273* (2006.01)
*G06F 11/22* (2006.01)

(52) U.S. Cl.
CPC ........ *G06F 11/273* (2013.01); *G06F 11/2242* (2013.01)

(58) Field of Classification Search
CPC ............. G06F 11/1641; G06F 11/2236; G06F 11/2242; G06F 11/273
See application file for complete search history.

(56) References Cited

U.S. PATENT DOCUMENTS 8,161,362 B2 * 4/2012 Bando ................. G06F 11/1695
714/799
9,104,403 B2 * 8/2015 Morrison ............ G06F 9/30145
(Continued)

FOREIGN PATENT DOCUMENTS

JP 2009-3557 A 1/2009
JP 2017-120966 A 7/2017

OTHER PUBLICATIONS

International Search Report (PCT/ISA/210) issued in PCT Application No. PCT/JP2019/031268 dated Oct. 8, 2019 with English translation (three (3) pages).
(Continued)

Primary Examiner — Joseph R Kudirka
(74) Attorney, Agent, or Firm — Crowell & Moring LLP

(57) ABSTRACT

An electronic control device includes: a diagnostic circuit unit configured to be reconfigurable so as to be used to diagnose each of a plurality of processing circuits that processes an input signal; an input data storage unit configured to temporarily store the input signal; an output data storage unit configured to temporarily store an output signal of the plurality of processing circuits; a reconfiguration control unit configured to sequentially write, to the diagnostic circuit unit as circuit configuration information, circuit information the same as that of the plurality of processing circuits; a diagnostic control unit configured to cause the diagnostic circuit unit to perform calculation using the input signal stored in the input data storage unit when the circuit configuration information is written to the diagnostic circuit unit; and a comparator configured to diagnose each of the plurality of processing circuits by comparing output of the diagnostic circuit unit and the output signal stored in the output data storage unit.

5 Claims, 8 Drawing Sheets

(56) References Cited

U.S. PATENT DOCUMENTS

| | | | |
|---|---|---|---|
| 10,628,277 B2 * | 4/2020 | Ozer | G06F 11/2236 |
| 2012/0066551 A1 * | 3/2012 | Palus | G06F 11/28 |
| | | | 714/39 |

OTHER PUBLICATIONS

Japanese-language Written Opinion (PCT/ISA/237) issued in PCT Application No. PCT/JP2019/031268 dated Oct. 8, 2019 (four (4) pages).

* cited by examiner

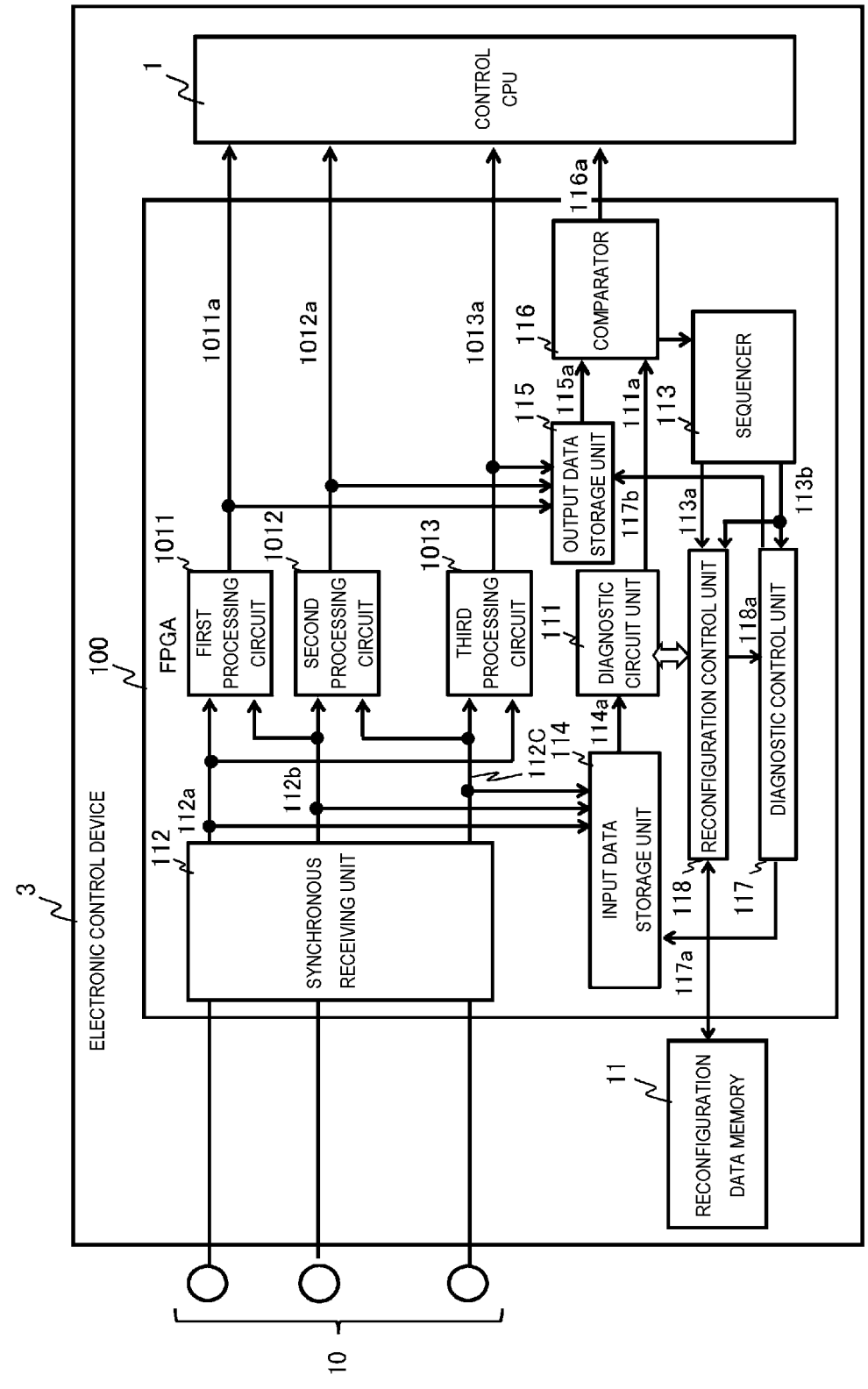
[FIG. 1]

[FIG. 2]

| PROCESSING NUMBER | IDENTIFICATION INFORMATION | | | NEXT PROCESSING NUMBER | WAITING TIME |
|---|---|---|---|---|---|
| | 1 | 2 | 3 | | |
| 0 | 1 | 0 | 0 | 1 | 0 |
| 1 | 0 | 1 | 0 | 2 | 0 |
| 2 | 0 | 0 | 1 | 0 | 0 |

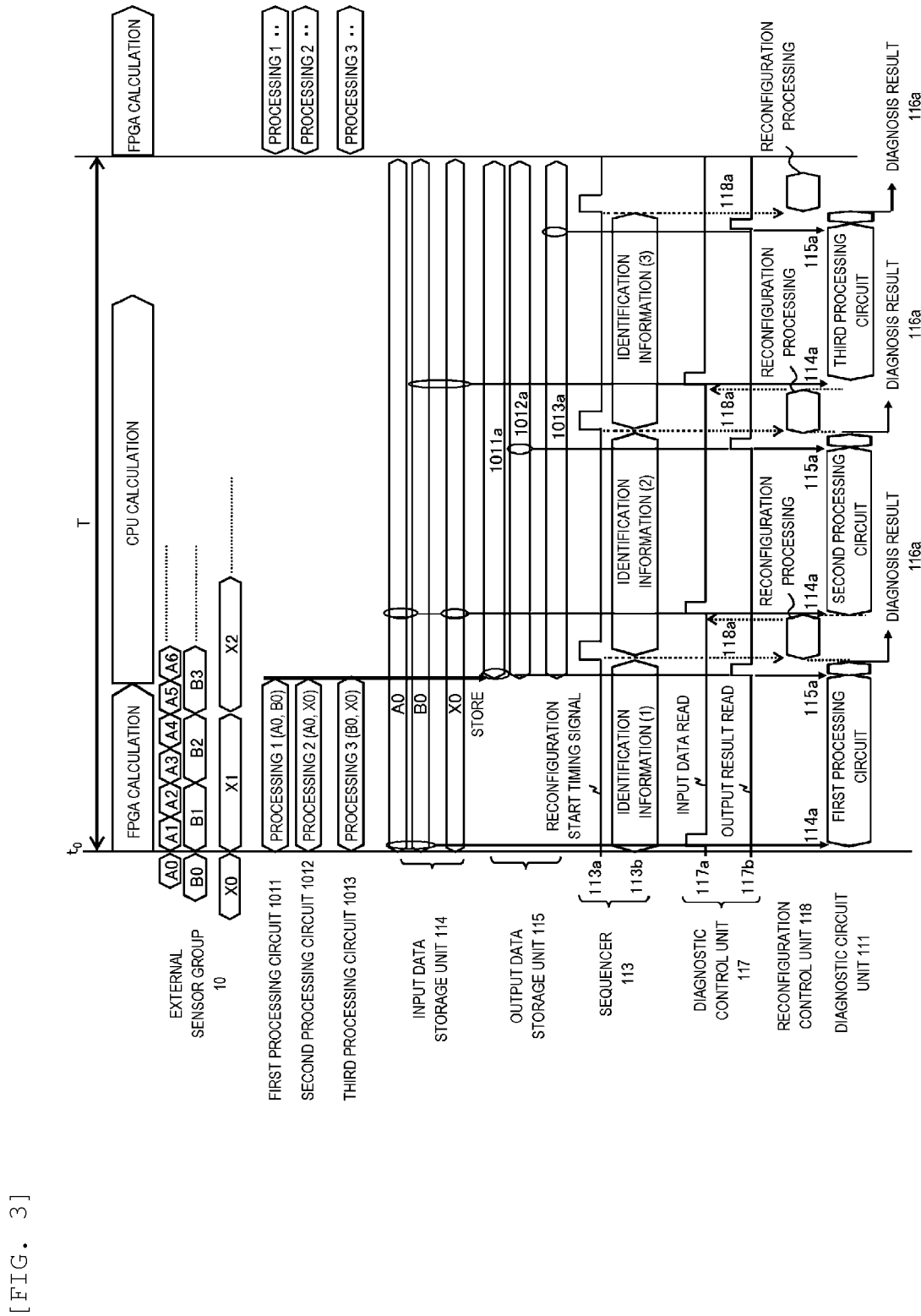
[FIG. 3]

[FIG. 4]
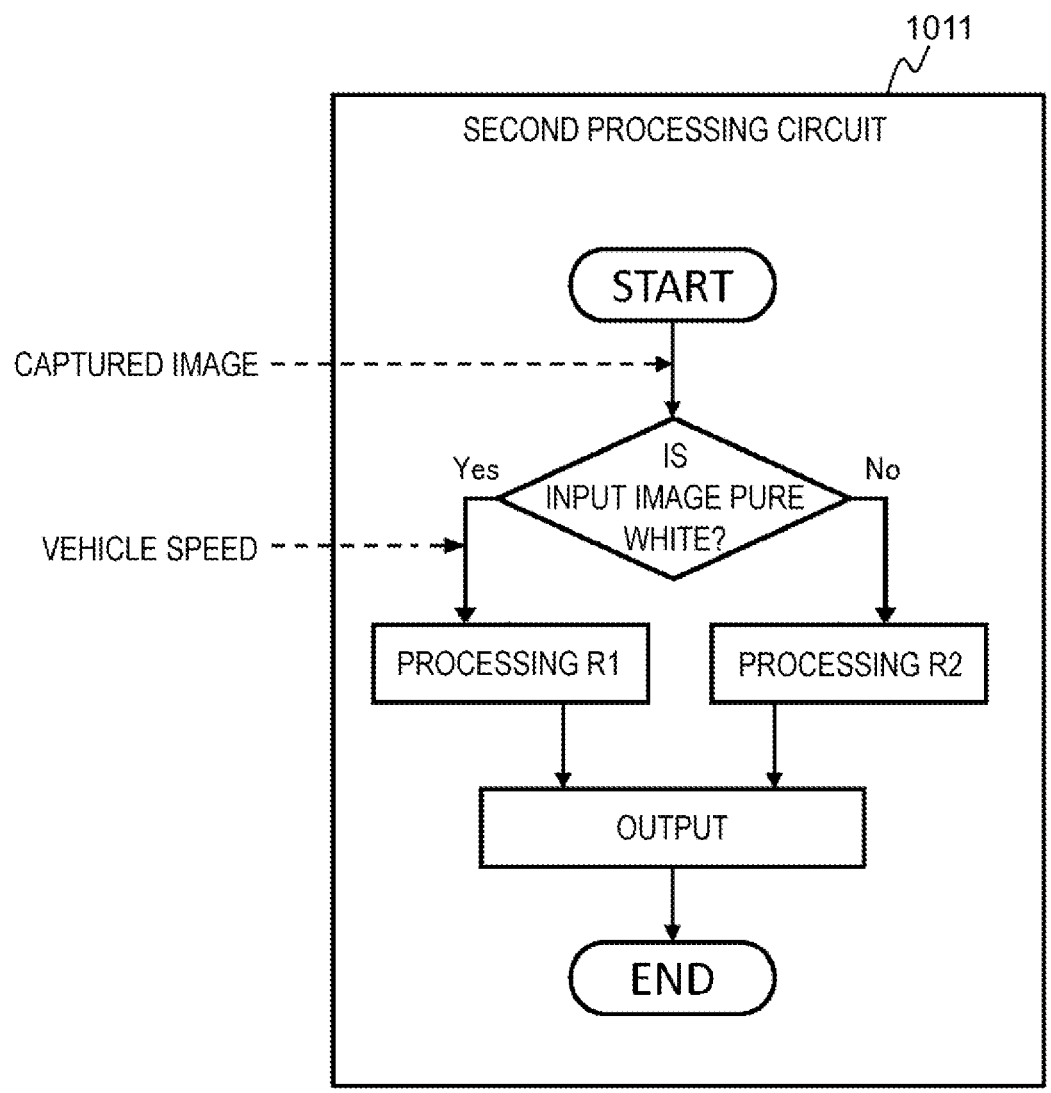

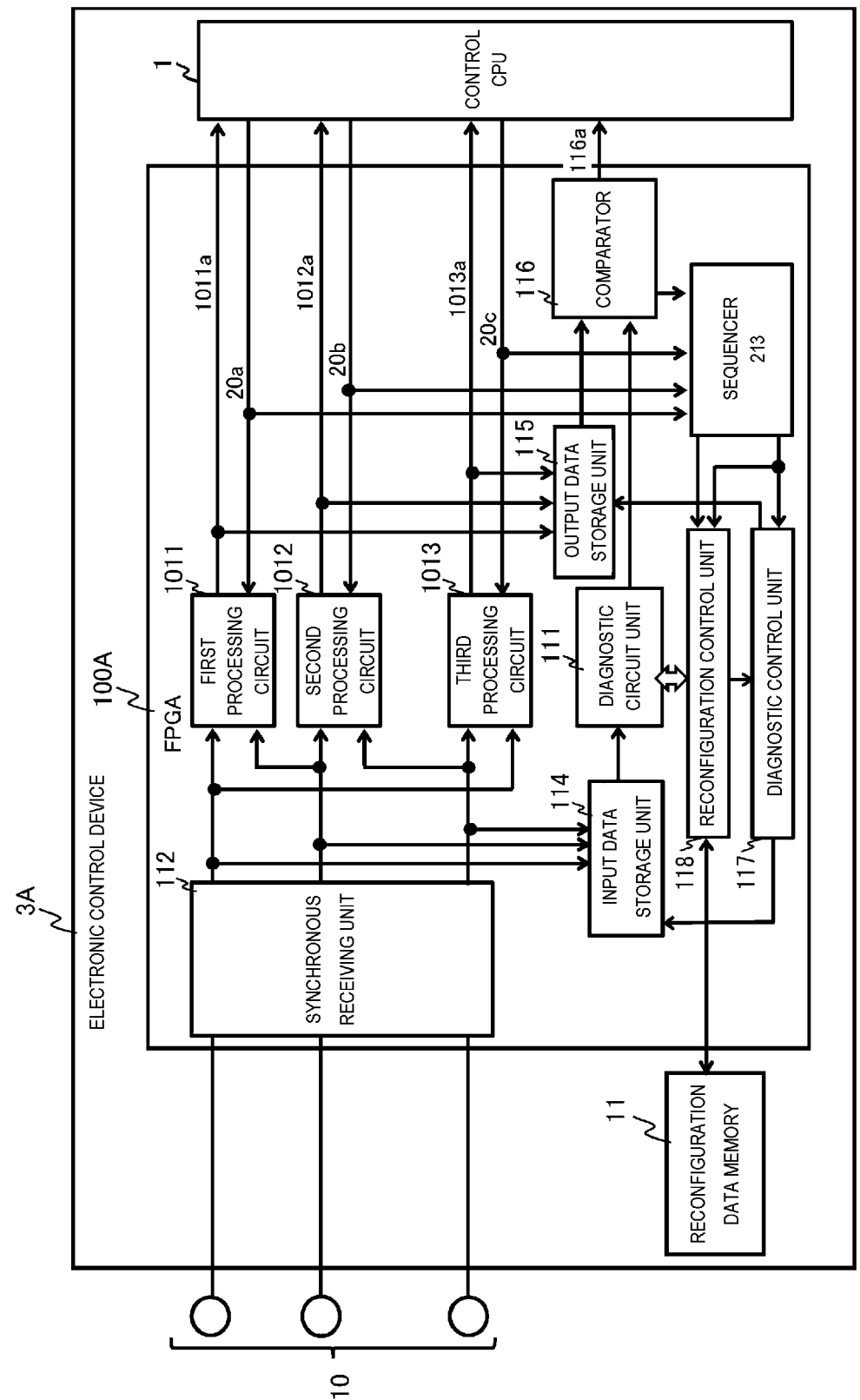
[FIG. 5]

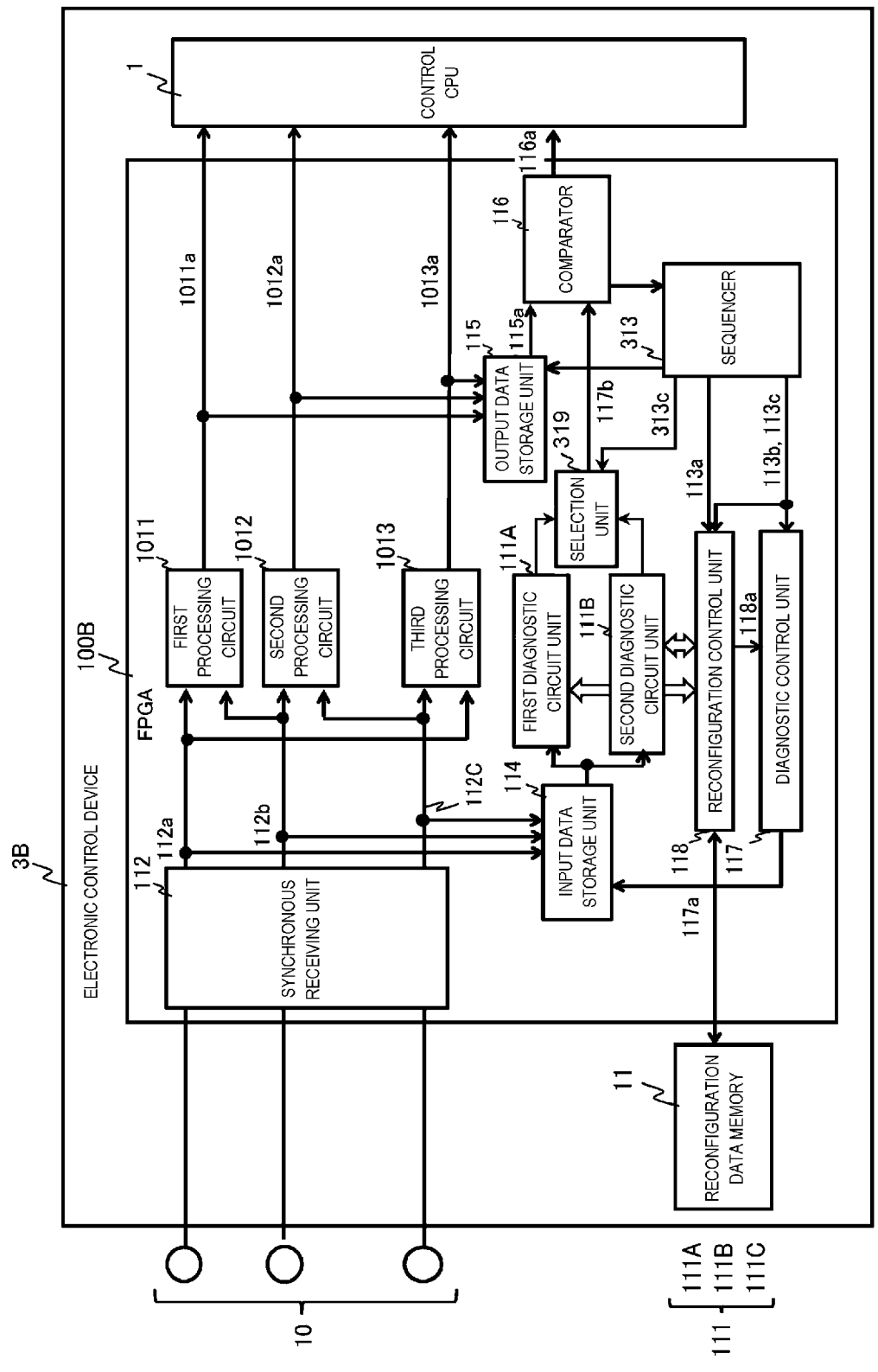
[FIG. 6]

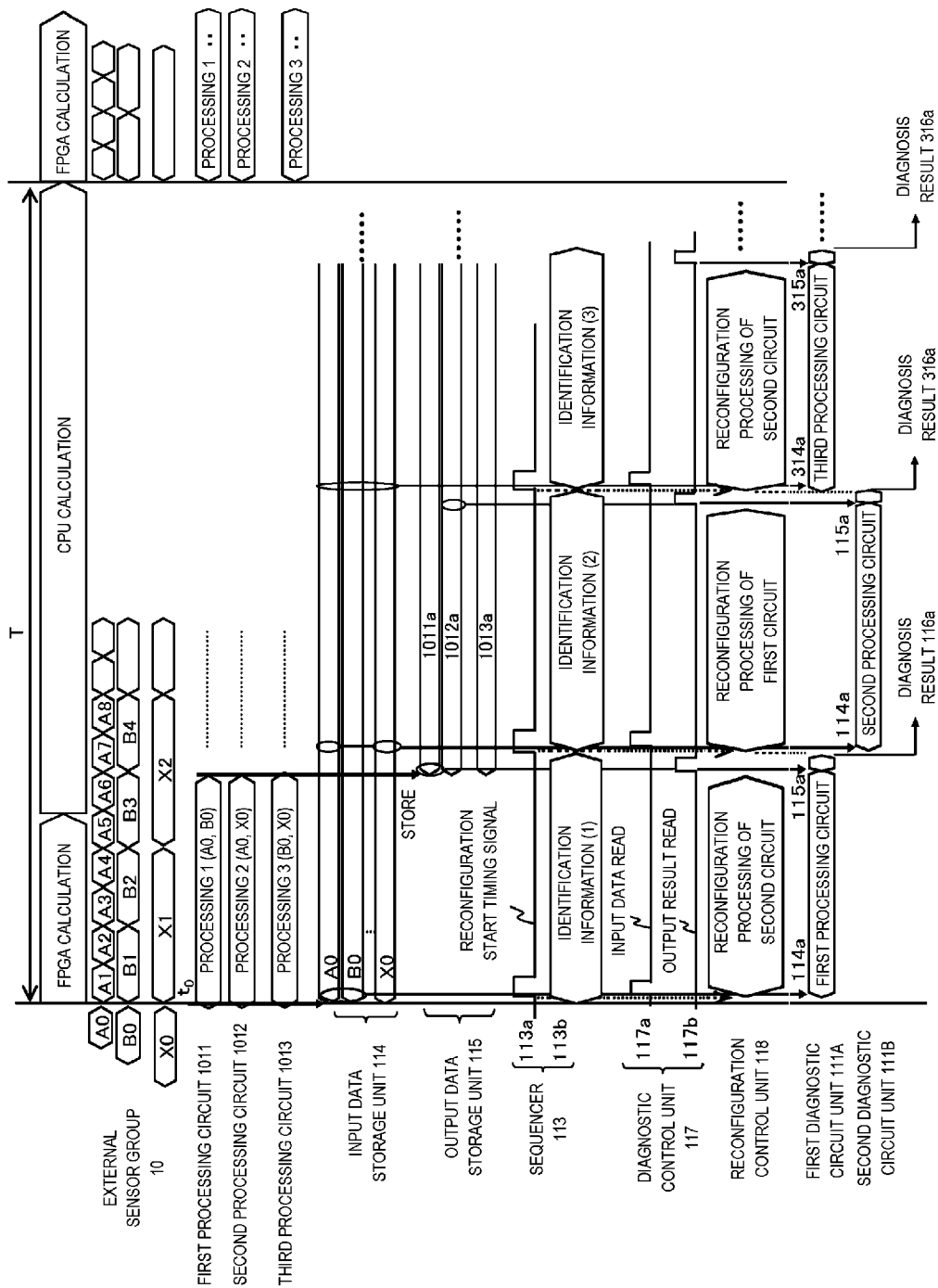
[FIG. 7]

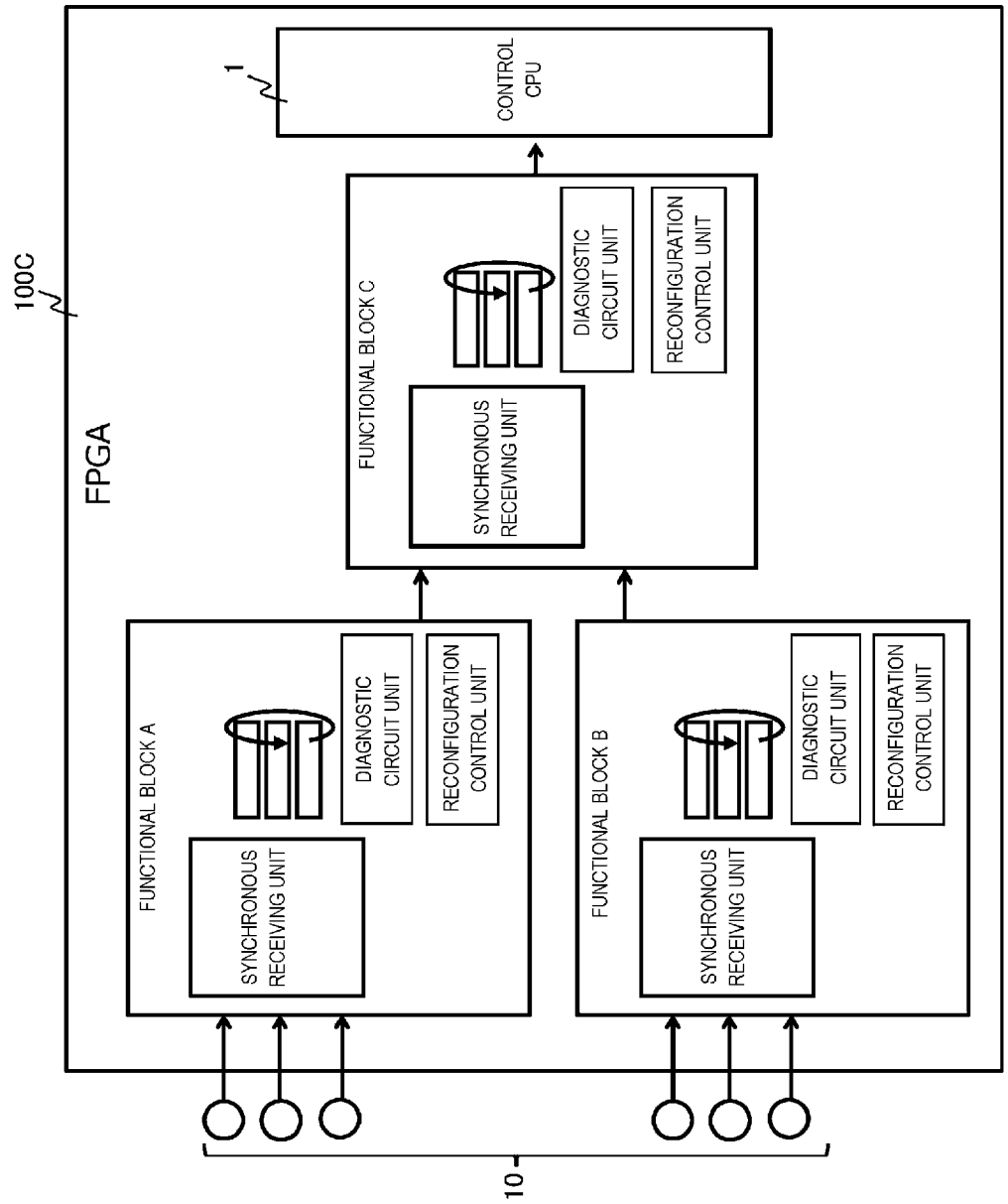
[FIG. 8]

ELECTRONIC CONTROL DEVICE FOR PROCESSING CIRCUIT DIAGNOSTICS

TECHNICAL FIELD

The present invention relates to an electronic control device.

BACKGROUND ART

Technology development is in progress with an aim of putting autonomous driving to practical use. The autonomous driving requires recognition, determination, and operation on behalf of a human, and requires advanced information processing and travel control. Further, processing performance and functions required for the autonomous driving including AI are increasing at an accelerated rate, and in order to flexibly respond to such a demand, in addition to a CPU, a GPU, and a dedicated hardware chip in the related art, an use of a programmable device such as a field-programmable gate array (FPGA) that can freely update a logic circuit has attracted attention. PTL 1 discloses an information processing device that includes: an element that can be reconfigured by programming; a device that, for inspecting a circuit configured by programming in the element, configures an inspection circuit including at least a duplication circuit that is a duplicate of the circuit and a comparator that compares between both outputs from the circuit and the duplicate circuit, with a partial configuration of a prepared region, which is reconfigurable, of the element; and a device that changes the circuit to be inspected.

CITATION LIST

Patent Literature

PTL 1: JP-A-2017-120966

SUMMARY OF INVENTION

Technical Problem

In the invention described in PTL 1, there is room for improvement in reliability.

Solution to Problem

An electronic control device according to a first aspect of the invention includes: a diagnostic circuit unit configured to be reconfigurable so as to used to diagnose each of a plurality of processing circuits that processes an input signal; an input data storage unit configured to temporarily store the input signal; an output data storage unit configured to temporarily store an output signal of the plurality of processing circuits; a reconfiguration control unit configured to sequentially write, to the diagnostic circuit unit as circuit configuration information, circuit information the same as that of the plurality of processing circuits; a diagnostic control unit configured to cause the diagnostic circuit unit to perform calculation using the input signal stored in the input data storage unit when the circuit configuration information is written to the diagnostic circuit unit; and a comparator configured to diagnose each of the plurality of processing circuits by comparing output of the diagnostic circuit unit and the output signal stored in the output data storage unit.

Advantageous Effect

According to the invention, the reliability of an electronic control device can be further improved. Problems, configurations, and effects other than those described above will be apparent with reference to the description of following embodiments.

BRIEF DESCRIPTION OF DRAWINGS

FIG. 1 is a configuration diagram of an electronic control device 3 according to a first embodiment.

FIG. 2 is a diagram showing an example of a sequence table included in a sequencer 113.

FIG. 3 is a processing sequence diagram of the electronic control device 3 according to the first embodiment.

FIG. 4 is a schematic diagram showing an operation of a second processing circuit 1012.

FIG. 5 is a configuration diagram of an electronic control device 3A according to a second embodiment.

FIG. 6 is a configuration diagram of an electronic control device 3B according to a third embodiment.

FIG. 7 is a sequence diagram of the electronic control device 3B according to the third embodiment.

FIG. 8 is a conceptual diagram showing a configuration of an FPGA 100C according to a fourth embodiment.

DESCRIPTION OF EMBODIMENTS

Hereinafter, embodiments of the invention will be described with reference to the drawings. The following description and drawings are examples for describing the invention, and are omitted and simplified as appropriate for clarification of the description. The invention can be implemented in various other forms. The number of components may be singular or plural, unless otherwise specified.

First Embodiment

Hereinafter, a first embodiment of an electronic control device according to the invention will be described with reference to FIGS. 1 to 4. In the present embodiment, the electronic control device is mounted on a vehicle, but may be used outside the vehicle, for example, in a calculation room.

FIG. 1 is a configuration diagram of an electronic control device 3 according to the first embodiment. The electronic control device 3 includes an FPGA 100 which is a reconfigurable logic circuit, a reconfiguration data memory 11 which stores information of circuits configured in the FPGA 100, and a control CPU 1 which is a central processing unit. The electronic control device 3 receives sensor information from an external sensor group 10 mounted on the vehicle.

The external sensor group 10 includes two or more sensors. The sensors include, for example, cameras, millimeter-wave radars, laser imaging detection and ringing (LIDAR), ultrasonic sensors, or the like. The external sensor group 10 may include a plurality of sensors of the same type.

The control CPU 1 performs calculation for vehicle control using data 1011a to 1013a described later, which are output of the FPGA 100. Hereinafter, this calculation is referred to as "CPU calculation", and a time required for the CPU calculation is referred to as a "CPU calculation time". The CPU calculation is, for example, motion prediction of an object existing around the vehicle and trajectory planning of the vehicle. When the control CPU 1 receives an error signal 116a described later from the FPGA 100, the control CPU 1 performs processing when an error occurs. The processing when an error occurs is to interrupt the calculation and continue output in the immediately preceding control cycle, or to proceed to a degenerate operation.

The FPGA 100 includes a first processing circuit 1011, a second processing circuit 1012, a third processing circuit 1013, a diagnostic circuit unit 111, a synchronous receiving unit 112, a sequencer 113, an input data storage unit 114, an output data storage unit 115, a comparator 116, a diagnostic control unit 117, and a reconfiguration control unit 118. Hereinafter, the first processing circuit 1011, the second processing circuit 1012, and the third processing circuit 1013 are collectively referred to as a "processing circuit" 101. Of the configurations of the FPGA 100, the synchronous receiving unit 112 and the processing circuit 101 execute a core function of the electronic control device 3. Details will be described later, and the other configurations are used for diagnosing the processing circuit 101.

The configuration excluding the diagnostic circuit unit 111 included in the FPGA 100 is reconfigured on the logic circuit of the PFGA 100 when the FPGA 100 is started. Such circuit information is stored in the reconfiguration data memory 11 or a ROM (not shown).

The first processing circuit 1011, the second processing circuit 1012, and the third processing circuit 1013 operate in parallel to perform fusion processing in which a plurality of pieces of sensor information output by the external sensor group 10 are combined. The fusion processing is, for example, processing that calculates a distance to an object by combining camera image data and radar information, or processing that complements LIDAR information and performs object recognition when the accuracy of camera information is poor under bad weather. However, the processing circuit 101 does not directly receive the sensor information from the external sensor group 10, but receives the sensor information via the synchronous receiving unit 112.

Calculation results of the first processing circuit 1011, the second processing circuit 1012, and the third processing circuit 1013 are referred to as the data 1011a, the data 1012b, and the data 1013a, respectively. Further, in the following, the calculation results of the processing circuit 101 are also referred to as "output data". Further, the sensor information input to the processing circuit 101 is also referred to as "input data".

In the following, calculation performed by the processing circuit 101 is collectively referred to as "FPGA calculation", and a time required for the FPGA calculation is referred to as an "FPGA calculation time". However, when the time required for each processing circuit 101 is different, the longest processing time is referred to as the FPGA calculation time.

The electronic control device 3 executes processing from the collection of the sensor information to the vehicle control by the control CPU 1 during a control cycle T, which is a predetermined time, and repeats the processing. Since the data 1011a to 1013a output by the FPGA 100 is used for the calculation of the control CPU 1, the control CPU 1 performs the calculation after the calculation by the FPGA 100 is completed. That is, the control cycle T is longer than a sum of the FPGA calculation time and the CPU calculation time. Further, the control cycle T is at least three times as long as the FPGA calculation time. Details will be described later.

The synchronous receiving unit 112 buffers the sensor information transmitted from each sensor, and absorbs latency between the sensors and the FPGA 100, for example, a variation in signal transmission timing due to a difference in cable length. An operation of the synchronous receiving unit 112 is as follows, for example. That is, the sensor having the longest cable length determined in advance is distinguished from other sensors, and the synchronous receiving unit 112 temporarily stores the sensor information received from the other sensors. When the synchronous receiving unit 112 receives the sensor information from the sensor having the longest cable length, the synchronous receiving unit 112 outputs a temporarily stored signal and the sensor information to the processing circuit 101 and the input data storage unit 114. However, the synchronous receiving unit 112 writes to the input data storage unit 114 only once in the control cycle T described later.

The input data storage unit 114 is a storage region in which the sensor information is temporarily stored. However, the input data storage unit 114 may be a memory circuit or a flip-flop. The output data storage unit 115 is a storage region in which the calculation result of the processing circuit 101 is temporarily stored.

The diagnostic circuit unit 111 is a common diagnostic circuit region for the processing circuit 101, and is rewritten and used in the same processing circuit as that of a diagnosis target by dynamic reconfiguration. The sensor information read from the input data storage unit 114 is input to the diagnostic circuit unit 111 after the reconfiguration, and the calculation result is output to the comparator 116. For example, first, the diagnostic circuit unit 111 is rewritten to the same processing circuit as the first processing circuit 1011, and receives the sensor information input to the first processing circuit 1011. Next, the diagnostic circuit unit 111 is rewritten to the same processing circuit as the second processing circuit 1012, and receives the sensor information input to the second processing circuit 1012.

The comparator 116 compares the calculation result output by the diagnostic circuit unit 111 with output data 115a output by the output data storage unit 115. However, the output data 115a is output from the output data storage unit 115 to the comparator 116 by functioning of the diagnostic control unit 117. The comparator 116 outputs the error signal 116a to the control CPU 1 when the calculation result and the output data 115a do not match. The comparator 116 may or may not output, when the calculation result and the output data 115a match, a signal notifying the control CPU 1 that the diagnosis target is normal. When the comparison is completed, the comparator 116 outputs a signal indicating that the comparison is completed to the sequencer 113.

The sequencer 113 manages an order of diagnosing the processing circuit 101 and a reconfiguration timing of a diagnostic circuit according to a sequence table described later. Specifically, the sequencer 113 transmits a reconfiguration start timing signal 113a and identification information 113b indicating a processing circuit of the diagnosis target to the reconfiguration control unit 118, and outputs the identification information 113b indicating the processing circuit of the diagnosis target to the diagnostic control unit 117. Hereinafter, the order of diagnosing the processing circuit 101 is also referred to as a "diagnosis order".

When the reconfiguration control unit 118 receives the reconfiguration start timing signal 113a from the sequencer 113, the reconfiguration control unit 118 reconfigures the diagnostic circuit unit 111 into a specified processing circuit according to the identification information 113b indicating the processing circuit of the diagnosis target. The reconfiguration control unit 118 reads reconfiguration data of the processing circuit specified by the identification information 113b from the reconfiguration data memory 11 existing outside the FPGA 100, and executes the reconfiguration of the diagnostic circuit unit 111. When the reconfiguration is completed, the reconfiguration control unit 118 notifies the diagnostic control unit 117 of a reconfiguration completion signal 118a.

The diagnostic control unit 117 controls reading of the input data of the diagnostic circuit unit 111 and the output data for diagnosis. Similar to the reconfiguration control unit 118, the diagnostic control unit 117 recognizes a number of the processing circuit of the diagnosis target by the identification information 113b received from the sequencer 113. When the diagnostic control unit 117 receives the reconfiguration completion signal 118a from the reconfiguration control unit 118, the diagnostic control unit 117 reads the same data as the data input to the processing circuit of the diagnosis target from the input data storage unit 114, and inputs the same data to the diagnostic circuit unit 111. Further, the diagnostic control unit 117 reads the output data of the processing circuit of the diagnosis target from the output data storage unit 115, and inputs the output data to the comparator 116.

FIG. 2 is a diagram showing an example of the sequence table included in the sequencer 113. The sequencer 113 outputs the reconfiguration start timing signal 113a, the identification information 113b of the circuit of the diagnosis target, or the like according to the sequence table. From the left of the table shown in FIG. 2, the first column shows a processing number, the second column shows identification information of a circuit of a diagnosis target, the third column shows a processing number to be executed next, and the fourth column shows a waiting time before proceeding to the next processing. In the example of FIG. 2, at a processing number 0, the reconfiguration start timing signal 113b is output together with the identification information 113a indicating the processing circuit 101. When diagnostic processing at the processing number 0 is completed and a signal is input to the sequencer 113 from the comparator 116, a content of a next processing number 1 is output. When the processing proceeds to a processing number 3, a next processing number becomes 0, and the processing returns to the processing number 0 to operate. The above indicates that the processing of the processing numbers 0 to 3 is repeated.

Here, the table is only called a sequence table for convenience, and the information may not be stored in a table format. That is, a format for storing the information is optional as long as the information shown in FIG. 2 can be stored.

FIG. 3 is a processing sequence diagram of the electronic control device 3. In FIG. 3, time passes from the left to the right. As described above, the control cycle T is equal to or greater than the sum of the FPGA calculation time and the CPU calculation time. In an example shown in FIG. 3, the external sensor group 10 includes three sensors, and the sensor information to be output is A, B, and X. However, in the following, numbers are added to the sensor information to be output in an output order, for example, A0, A1, A2, A3, and so on. As shown in FIG. 3, a cycle in which the external sensor group 10 outputs the sensor information is not constant, and the cycle of X is the longest.

The synchronous receiving unit 112 (not shown in FIG. 3) buffers when A and B are received, and when X is received, stores X together with the received latest A and B into the processing circuit 101 and the input data storage unit 114. The information stored in the input data storage unit 114 is retained during the control cycle T. Further, the output data of each processing circuit 101 is collectively stored in the output data storage unit 115, and the data is also stored until just before the end of the control cycle T.

At a time t0, the diagnostic circuit unit 111 has already been written by reconfiguring into the same circuit as the first processing circuit 1011. The diagnostic circuit unit 111 performs the same calculation processing as that of the first processing circuit 1011 using input data 114a read by the diagnostic control unit 117. Then, the diagnostic circuit unit 111 performs diagnosis by comparing the calculation result with the calculation result of the first processing circuit 1011 stored in the output data storage unit 115, that is, the output data 115a, using the comparator 116. The control CPU 1 is notified of a diagnosis result 116a.

Next, the diagnostic circuit unit 111 is reconfigured into the same circuit as the second processing circuit 1012 by the reconfiguration control unit 118. When the reconfiguration is completed, the reconfiguration completion signal 118a is used as a trigger for reading the input data A0 and X0 from the input data storage unit 114, and the input data A0 and X0 are used as the input data of the diagnostic circuit unit 111. The input data A0 and X0 are the same as the data used by the second processing circuit 1012 for calculation. In the diagnostic circuit unit 111, calculation processing similar to that of the second processing circuit 1012 is performed. The diagnosis is performed by comparing the calculation result with actual output data of the processing circuit 1012 temporarily stored in the output data storage unit 115.

Finally, the diagnostic circuit unit 111 is reconfigured into the same circuit as the third processing circuit 1013 by the reconfiguration control unit 118, and calculation and comparison are performed in the similar manner thereafter. Then, the diagnostic circuit unit 111 is written by reconfiguring into the same circuit as the first processing circuit 1011 in preparation for the calculation in the next control cycle. In this way, the diagnostic circuit unit 111 is reconfigured into various processing circuits 101 by the reconfiguration control unit 118, and the diagnostic processing is repeated.

As shown in FIG. 3, the same processing as that of the first processing circuit 1011 by the diagnostic circuit unit 111 is performed almost at the same time as FPGA processing, and the same processing as that of the second processing circuit 1012 by the diagnostic circuit unit 111 is performed thereafter. Then, the same processing as that of the third processing circuit 1013 by the diagnostic circuit unit 111 is further performed thereafter, and the end of the processing is before the end of the same control cycle T. Therefore, the control cycle T is at least three times as long as the FPGA processing time. However, this is because the FPGA processing includes parallel processing by three circuits, and when the FPGA processing includes parallel processing by five circuits, the control cycle T is at least five times as long as the FPGA processing time.

FIG. 4 is a schematic diagram showing an operation of the second processing circuit 1012. In an example shown in FIG. 4, a captured image and a vehicle speed are input to the second processing circuit 1012. The second processing circuit 1012 determines whether the input captured image is pure white. When the second processing circuit 1012 determines that the captured image is pure white, the second processing circuit 1012 executes processing R1, and when the second processing circuit 1012 determines that the captured image is not pure white, the second processing circuit 1012 executes processing R2. In the processing R1, not only the captured image but also the vehicle speed is used, and in the processing R2, only the captured image is used. Then, a result of the processing R1 or the processing R2 is output, and the processing of the second processing circuit is completed.

When the operation of the second processing circuit 1012 is as shown in FIG. 4, processing to be executed differs greatly depending on output of a sensor, that is, the captured image. Therefore, if sensor data input to the processing circuit 101 and sensor data input to the diagnostic circuit unit 111 are slightly different, calculation of the two will be different. Therefore, it is necessary to provide the input data storage unit 114 in the electronic control device 3 to store the sensor data input to the processing circuit 101.

The following configuration can be considered as calculation similar to duplication of processing (hereinafter referred to as "pseudo duplication"). That is, in the pseudo duplication, the input data storage unit 114 is not used, the output of the external sensor group 10 is read at the timing when the diagnostic circuit unit 111 performs the calculation, and the diagnostic circuit unit 111 and the processing circuit 101 perform the calculation at the same time. Accordingly, the diagnostic circuit unit 111 and the processing circuit 101 perform the calculation using the same sensor data, and the pseudo duplication is performed by comparing the calculation results. However, in the pseudo duplication, since sensor data different from sensor data used by a control CPU 20 for the calculation is used, duplication is not guaranteed for the data used by the control CPU 1 for the calculation. Therefore, the pseudo duplication is insufficient, and the input data storage unit 114 is required as in the present embodiment.

According to the first embodiment described above, the following operational effects can be acquired.

(1) The electronic control device 3 includes: the diagnostic circuit unit 111 configured to be reconfigurable so as to be used to diagnose each of a plurality of processing circuits 101 that processes input sensor information; the input data storage unit 114 temporarily storing the input sensor information; the output data storage unit 115 temporarily storing an output signal of the plurality of processing circuits; the reconfiguration control unit 118 configured to sequentially write, to the diagnostic circuit unit 111 as circuit configuration information, circuit information the same as that of the processing circuits 101; the diagnostic control unit 117 configured to cause the diagnostic circuit unit 111 to perform calculation using the sensor information stored in the input data storage unit 114 when the circuit configuration information is written to the diagnostic circuit unit 111; and the comparator 116 configured to diagnose each of the plurality of processing circuits by comparing output of the diagnostic circuit unit 111 and the output signal stored in the output data storage unit 115. Therefore, diagnosis is possible under the same operation condition as in actual use by using the input data storage unit 114 and the output data storage unit 115, and the reliability of an electronic control device and an in-vehicle system can be further improved.

(2) The electronic control device 3 includes: the sequencer 113 configured to manage a diagnosis order, which is an order of diagnosis in the plurality of processing circuits, and instruct the reconfiguration control unit 118 to perform reconfiguration. The output signal stored in the output data storage unit 115 and used by the comparator 116 for comparison is determined based on the diagnostic order managed by the sequencer 113. Therefore, the order of diagnosing the processing circuit 101 can be managed.

(3) The processing circuits 101 are configured to operate at a predetermined processing cycle. The circuit information of any one of the plurality of processing circuits is written to the diagnostic circuit unit 111 at a time. The processing cycle T is longer than a sum of calculation times of the respective processing circuits 101. Therefore, it is possible to duplicate all the processing circuits 101 in the control cycle T. That is, if an error is detected, the electronic control device 3 can recognize the occurrence of the error before the control cycle T ends, so that an appropriate measure can be taken.

(4) The processing circuits 101 are configured as the reconfigurable FPGA 100. Therefore, the electronic control device 3 can perform various calculation according to a situation, and any of the calculation can be duplicated by the diagnostic circuit unit 111.

(First Modification)

When the comparator 116 outputs an error signal, that is, when the calculation result output by the diagnostic circuit unit 111 and the output data 115*a* output by the output data storage unit 115 do not match, an abnormal part may be identified as follows. For example, if an error is detected in the diagnosis in the first control cycle and the error does not recur in the diagnosis in the next control cycle, it is determined that there is an abnormality on the diagnostic circuit side refreshed by the reconfiguration. Further, if an error is detected twice in a row, it is determined that there is always an abnormality in the processing circuit 101 that is not reconfigured.

(Second Modification)

In the first embodiment described above, not only the diagnostic circuit unit 111 but also various components such as the processing circuit 101, the synchronous receiving unit 112, and the input data storage unit 114 are mounted on the FPGA 100. However, the FPGA 100 may be mounted with the diagnostic circuit unit 111 only, and other components may be mounted on one other than the FPGA 100. For example, the processing circuit 101 may be implemented by a hardware circuit, may be implemented by software processing, or may be configured on a logic circuit different from the FPGA 100. The input data storage unit 114 and the output data storage unit 115 may be implemented by a semiconductor memory provided outside the FPGA 100, or may be implemented by a latch circuit.

(Third Modification)

The reconfiguration control unit 118 may reconfigure the processing circuit 101 as needed.

Second Embodiment

A second embodiment of the electronic control device will be described with reference to FIG. 5. In the following description, the same components as those of the first embodiment are denoted by the same reference numerals, and differences will be mainly described. Points that are not specifically described are the same as those of the first embodiment. The present embodiment differs from the first embodiment mainly in that some processing circuits may not be used.

FIG. 5 is a configuration diagram of an electronic control device 3A according to the second embodiment. The same parts as those in FIG. 1 are given the same reference numerals, and since the configurations and operations are the same, the description is omitted. An FPGA 100A differs from that of the first embodiment in that whether the processing circuit 101 is used can be controlled by control signals 20*a* to 20*c* from the control CPU 20. The control signals 20*a* to 20*c* are also input to a sequencer 213, and the sequencer 213 can recognize which processing circuit is being used.

The control CPU 1 determines a processing circuit 101 not required for calculation based on a predetermined rule or a predetermined calculation, and outputs, to the FPGA 100A, the signals 20a to 20c respectively corresponding to a processing circuit 101 that is not required for calculation. Since the control CPU 1 in the present embodiment determines the processing circuit 101 that is not required for calculation, the control CPU 1 can also be referred to as an "unnecessary circuit determination unit".

The sequencer 213 uses the information to perform control such that diagnosis for an unused processing circuit is skipped for reconfiguration of a diagnostic circuit and diagnostic control. Specifically, information of a sequence table provided inside the sequencer 213 is masked by using the control signals 20a to 20c. That is, the identification information of the circuit of the diagnosis target in the second column from the left in FIG. 2 is masked by using the control signals 20a to 20c. For example, in a case where the control signal 20a is "High" when the first processing circuit 1011 is set to be unused, a column whose identification information is described as "1" is masked. Accordingly, the diagnosis of the first processing circuit 1011 is skipped as in the case where "0" is described as the identification information.

According to the second embodiment described above, the following operational effects can be acquired.

(5) The electronic control device 3 includes the control CPU 1 configured to determine a processing circuit 101 that is not required for calculation among the plurality of processing circuits 101. The reconfiguration control unit 118 sequentially writes, to the diagnostic circuit unit 111 as circuit configuration information, circuit information the same as that of the plurality of processing circuits excluding unnecessary circuits. Therefore, by reducing an unnecessary reconfiguration time and diagnosis time, an abnormality detection time within a control cycle can be shortened, so that the reliability of the electronic control device 3 and the in-vehicle system can be improved. Further, the invention also has an effect of reducing power consumption by stopping unused processing circuits.

Modification in Second Embodiment

The reconfiguration control unit 118 may erase the processing circuit 101 determined to be not used by the control CPU 1, that is, reconfigure the processing circuit 101 into a blank circuit. In this case, the blank circuit may be used by the diagnostic circuit unit 111.

Third Embodiment

A third embodiment of the electronic control device will be described with reference to FIGS. 6 and 7. In the following description, the same components as those of the first embodiment are denoted by the same reference numerals, and differences will be mainly described. Points that are not specifically described are the same as those of the first embodiment. The present embodiment is different from the first embodiment mainly in that a time for configuring the logic circuit is hidden in the diagnostic circuit unit.

FIG. 6 is a configuration diagram of an electronic control device 3B according to the third embodiment. The same parts as those in FIG. 1 are given the same reference numerals, and since the configurations and operations are the same, the description is omitted. In the third embodiment, the diagnostic circuit unit 111 includes a first diagnostic circuit unit 111A, a second diagnostic circuit unit 111B, and a selection unit 319 for selecting a diagnostic circuit which is used for diagnosis. Either of the first diagnostic circuit unit 111A and the second diagnostic circuit unit 111B has a region in which any one of the first processing circuit 1011, the second processing circuit 1012, and the third processing circuit 1013 can be configured.

A sequencer 313 in the present embodiment outputs, to the diagnostic control unit 117 and the reconfiguration control unit 118, not only the circuit identification information 113b for diagnostic control but also circuit identification information 313c for reconfiguration. A sequence table provided in the sequencer 313 in the present embodiment also includes information indicating a region of the first diagnostic circuit unit 111A or the second diagnostic circuit unit 111B in which reconfiguration is to be performed.

FIG. 7 is a sequence diagram of the electronic control device 3 according to the third embodiment. In FIG. 7, the same processing as those in FIG. 2 are denoted by the same reference numerals, and the description thereof will be omitted. In this sequence diagram, first, a circuit equivalent to the first processing circuit 1011 is configured in the first diagnostic circuit unit 111A. Further, the selection unit 319 selects the first diagnostic circuit unit side, so that the first processing circuit 1011 is diagnosed.

Here, in parallel with processing of the first diagnostic circuit unit 111A, the reconfiguration control unit 118 performs reconfiguration processing of the second diagnostic circuit unit 111B based on the circuit identification information 313c for reconfiguration from the sequencer 313. Accordingly, a circuit equivalent to the second processing circuit 1012, which is the next diagnosis target, is written in the second diagnostic circuit unit 111B. When the reconfiguration is completed and the diagnosis of the first diagnostic circuit unit 111A is completed, the selection unit 319 selects the second diagnostic circuit unit 111B, so that diagnosis of the next second processing circuit 1012 can be started without waiting time caused by reconfiguration.

According to the third embodiment described above, the following operational effects can be acquired.

(6) The diagnostic circuit unit 111 includes the first diagnostic circuit unit 111A and the second diagnostic circuit unit 111B in which circuit information the same as that of a processing circuit included in the plurality of processing circuits 101 is writable. The diagnostic control unit 117 is configured to cause the writing of the circuit information to the first diagnostic circuit unit 111A by the reconfiguration control unit 118 and the calculation by the processing circuit configured in the second diagnostic circuit unit 111B to be executed in an overlapped manner on a time-series basis. In this way, two diagnostic circuit units, that is, the first diagnostic circuit unit 111A and the second diagnostic circuit unit 111B are provided, and the reconfiguration processing and the diagnostic processing are alternately executed in the first diagnostic circuit unit 111A and the second diagnostic circuit unit 111B respectively. Therefore, a time for the diagnostic circuit unit 111 to perform only reconfiguration without performing calculation can be shortened as compared with that in the first embodiment, which leads to the improvement of the reliability of the electronic control device 3 and the in-vehicle system.

Fourth Embodiment

A fourth embodiment of the electronic control device will be described with reference to FIG. 8. In the following description, the same components as those of the first embodiment are denoted by the same reference numerals, and differences will be mainly described. Points that are not specifically described are the same as those of the first embodiment.

FIG. 8 is a conceptual diagram showing a configuration of an FPGA 100C according to the fourth embodiment. The FPGA 100C has the configuration of the FPGA 100 according to the first embodiment as one functional block, and includes a plurality of, for example, three functional blocks. Further, synchronous receiving units of sensor data are further synchronized between the functional blocks to implement synchronous reception of the entire sensor data. For example, when the external sensor group 10 includes several tens of sensors, the external sensor group 10 is divided into clusters such as in front, rear, left, and right, and the output data is subjected to fusion processing.

In this way, even when a plurality of functional blocks originally including a plurality of processing circuits operating in parallel are further built in, the time-division diagnostic processing shown in the first embodiment can be executed in parallel in each functional block.

The invention is not limited to the embodiments and the modifications described above, and includes various modifications and equivalent configurations within the scope of the appended claims. For example, the embodiments described above are described in detail for easy understanding of the invention, and the invention is not necessarily limited to those having all the configurations described above. Further, control lines and information lines indicate what is considered necessary for description, and not all control lines and information lines in a product are shown. In practice, it may be considered that almost all the configurations are connected with each other.

The embodiments and the modifications described above may be combined with each other. Although various embodiments and modifications are described above, the invention is not limited to the embodiments and the modifications. Other embodiments that are regarded within the scope of the technical idea of the invention are also included within the scope of the invention.

A disclosed content of the following priority basic application is incorporated herein by reference.

JP 2018-175217 (filed on Sep. 19, 2018)

REFERENCE SIGN LIST

1: control CPU
3, 3A, 3B: electronic control device
10: external sensor group
11: reconfiguration data memory
20: control CPU
100, 100A, 100B, 100C: FPGA
101: processing circuit unit
111: diagnostic circuit unit
111A: first diagnostic circuit unit
111B: second diagnostic circuit unit
112: synchronous receiving unit
113: sequencer
114: input data storage unit
115: output data storage unit
116: comparator
117: diagnostic control unit
118: reconfiguration control unit
319: selection unit
1011: first processing circuit
1012: second processing circuit
1013: third processing circuit

The invention claimed is:

1. An electronic control device, comprising:
a diagnostic circuit unit configured to be reconfigurable so as to be used to diagnose each of a plurality of processing circuits that processes an input signal;
an input data storage unit configured to temporarily store the input signal;
an output data storage unit configured to temporarily store an output signal of the plurality of processing circuits;
a reconfiguration control unit configured to sequentially write, to the diagnostic circuit unit as circuit configuration information, circuit information the same as that of the plurality of processing circuits;
a diagnostic control unit configured to cause the diagnostic circuit unit to perform a calculation using the input signal stored in the input data storage unit when the circuit configuration information is written to the diagnostic circuit unit;
a comparator configured to diagnose each of the plurality of processing circuits by comparing an output of the diagnostic circuit unit and the output signal stored in the output data storage unit; and
a sequencer configured to manage a diagnosis order, which is an order of diagnosis in the plurality of processing circuits, and instruct the reconfiguration control unit to perform reconfiguration, wherein
the output signal stored in the output data storage unit and used by the comparator for comparison is determined based on a diagnostic order managed by the sequencer.

2. The electronic control device according to claim 1, wherein
the plurality of processing circuits are configured to operate at a predetermined processing cycle,
the circuit information of any one of the plurality of processing circuits is written to the diagnostic circuit unit at a time, and
the processing cycle is longer than a sum of respective calculation times of the plurality of processing circuits.

3. The electronic control device according to claim 1, wherein
the diagnostic circuit unit includes a first region and a second region in which circuit information the same as that of a processing circuit included in the plurality of processing circuits is writable, and
the diagnostic control unit is configured to cause writing of circuit information to the first region by the reconfiguration control unit and calculation by a processing circuit configured in the second region to be executed in an overlapped manner on a time-series basis.

4. The electronic control device according to claim 1, further comprising:
an unnecessary circuit determination unit configured to determine an unnecessary circuit which is a processing circuit that is not required for calculation among the plurality of processing circuits, wherein
the reconfiguration control unit is configured to sequentially write, to the diagnostic circuit unit as the circuit configuration information, circuit information the same as that of the plurality of processing circuits excluding the unnecessary circuit.

5. The electronic control device according to claim 1, wherein
the plurality of processing circuits are configured as reconfigurable logic circuits.

* * * * *